June 2, 1964   H. J. CZAJKOWSKI   3,135,082
SWEEPER ATTACHMENT FOR COTTON PICKING MACHINES
Filed June 18, 1962   2 Sheets-Sheet 1

INVENTOR.
HENRY J. CZAJKOWSKI.
BY
Willard L. Groom
ATTORNEY.

INVENTOR.
HENRY J. CZAJKOWSKI.
BY Willard S. Grant
ATTORNEY.

United States Patent Office 3,135,082
Patented June 2, 1964

3,135,082
SWEEPER ATTACHMENT FOR COTTON PICKING MACHINES
Henry J. Czajkowski, 301 24th Ave., Yuma, Ariz.
Filed June 18, 1962, Ser. No. 203,312
2 Claims. (Cl. 56—28)

This invention pertains to a cotton sweeper attachment for a cotton picking machine.

One of the objects of this invention is to provide a cotton sweeper attachment for a cotton picking machine which is particularly adapted for salvaging loose cotton from the ground and depositing the cotton back on to the stalk so that the cotton can be repicked with the conventional cotton picking machine, all at the same time.

Another object of this invention is to reclaim cotton that has dropped to the ground during prior picking operation and to make it readily available to subsequent picking operations.

Still another object of this invention is to provide a cotton sweeper which sweeps and consolidates cotton lying on the ground surface toward the row of cotton stalks and to lift the cotton from between the stalks to a point above the ground and to deposit the lifted cotton on the passing stalks immediately in front of the cotton picking machine as it moves along the cotton rows.

One more object of this invention is lifting of the lower basal branches containing attached cotton to a position readily accessible to the picking spindles.

Further features and advantages of this invention will appear from a detailed description of the drawings in which.

Figure 2:
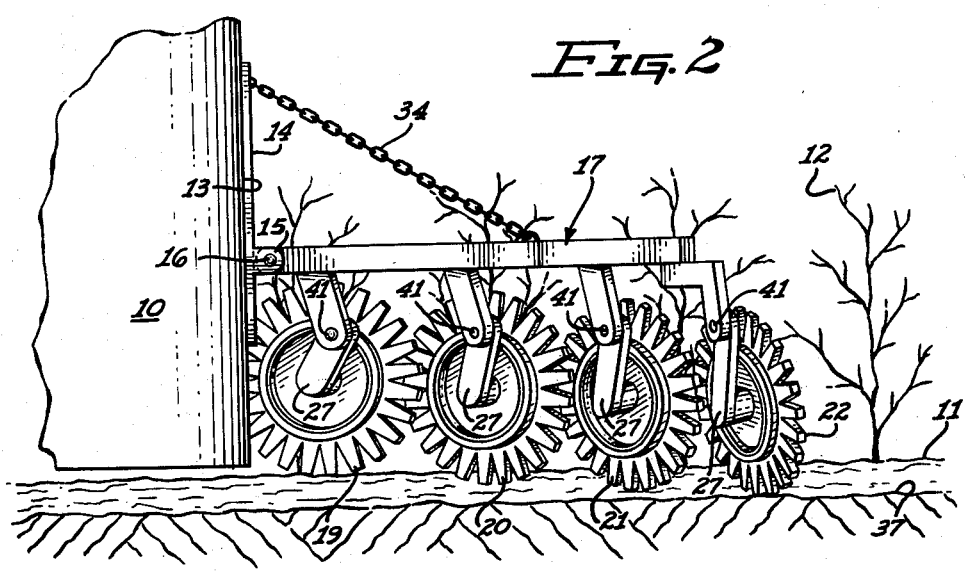
FIG. 2 is a side elevation of the cotton sweeper shown in FIG. 1.

As an example of one embodiment of this invention, there is shown a cotton sweeper attachment for a conventional cotton picking machine 10 which travels along the row 11 of cotton plants or stalks 12 in the usual manner. Fixed to the front 13 of the cotton picking machine 10 is a mounting frame 14 having formed thereon forked bracket portions 15 carrying pivot pins 16 upon which the outwardly divergently extending support arms 17 and 18 are pivotally mounted.

Figure 1:
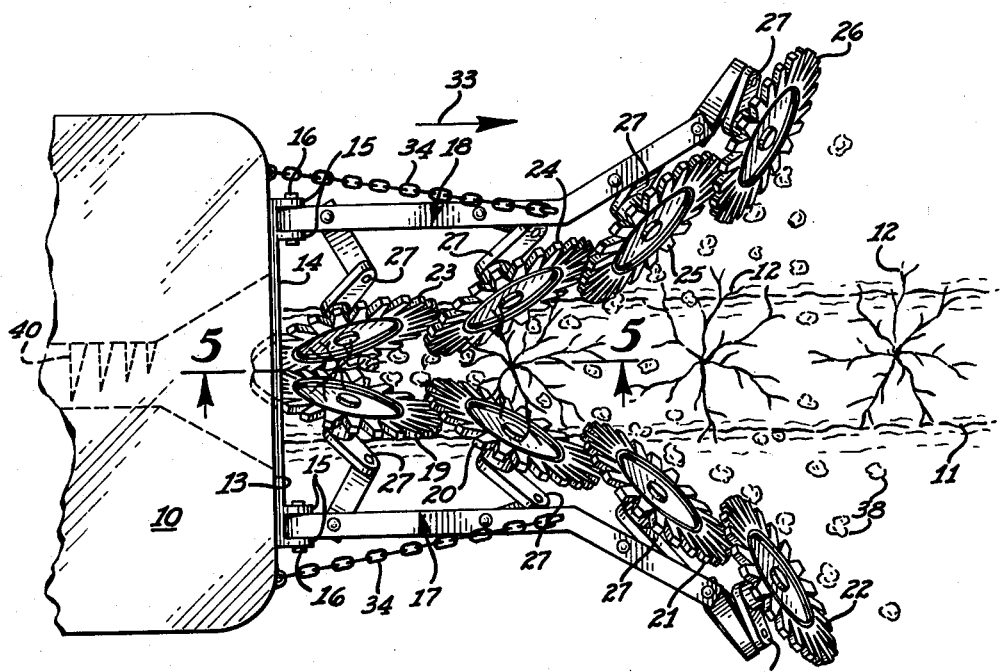
FIG. 1 is a top plan view of a cotton sweeper incorporating the features of this invention.
Figure 3:
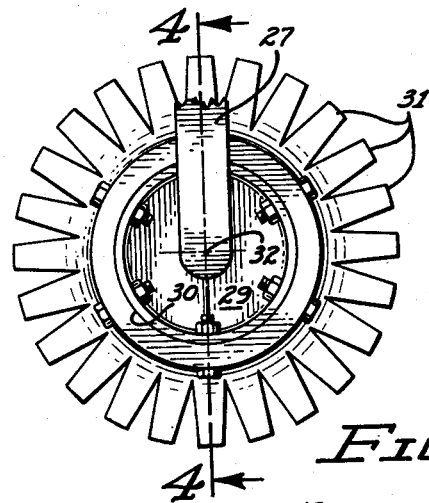
FIG. 3 is an enlarged side elevation of one of the sweeper wheels.
Figure 4:
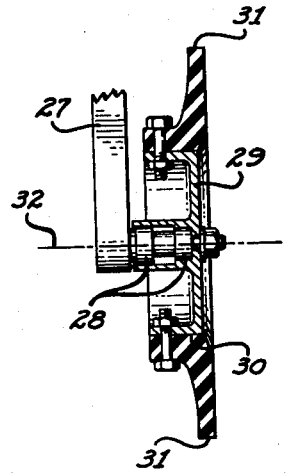
FIG. 4 is a diametral sectional view on the line 4—4 of FIG. 3.
Figure 5:
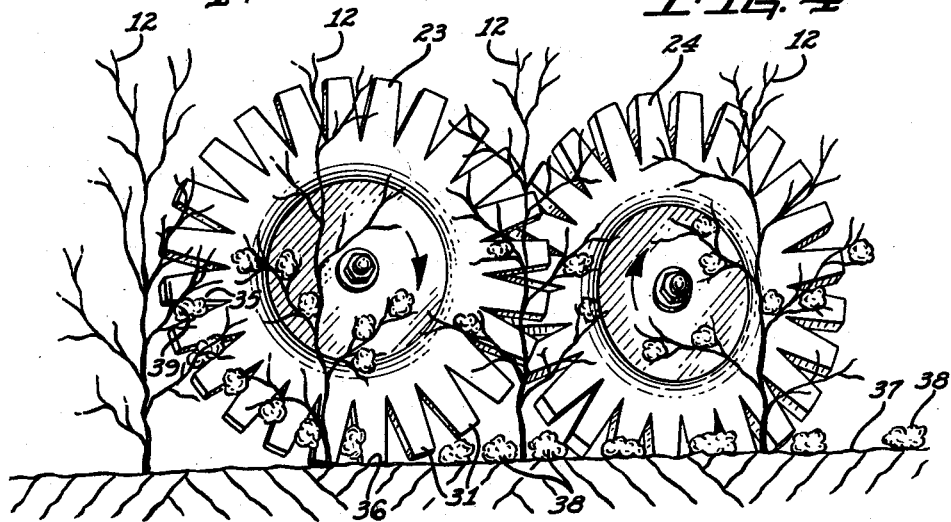
FIG. 5 is an enlarged sectional view on the line 5—5 of FIG. 1.

A series of sweeper wheels 19, 20, 21 and 22 and 23, 24, 25 and 26 are provided respectively on the arms 17 and 18 and are positioned in divergent relationship, as best shown in FIG. 1 by suitable brackets 27 to the outer ends of which are journaled the wheels by suitable bearings 28. Each of the sweeper wheels comprises a disc 29 journaled on the bearing 28 and about the disc periphery 30 is mounted a series of radially disposed flexible sweeper fingers or circular comb 31. The axes of rotation 32 are angularly disposed relative to the direction of travel 33 of the device along a cotton stalk row 11. A pair of positioning and lifting chains 34 are connected between the mounting frame 14 and the support arms 17 and 18.

Figure 6:
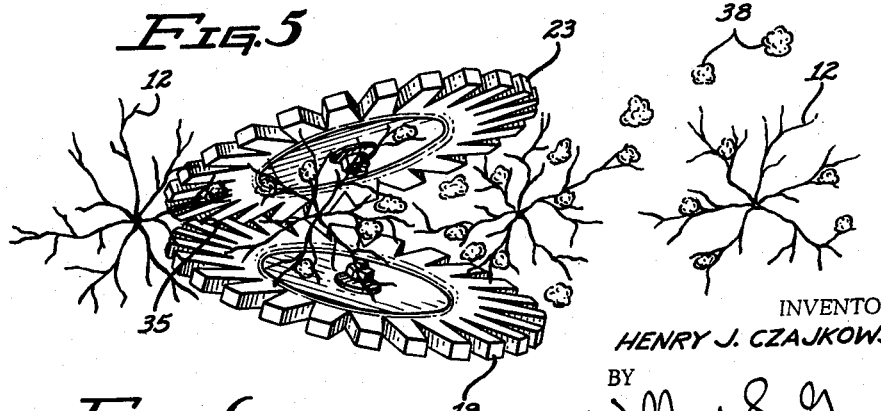
FIG. 6 is an enlarged plan view of the rearmost lifter wheels shown in FIG. 1.

The sweeper wheels are normally positioned to roll on the ground with the flexible fingers 31 bending backwardly under the forward movement 33 of the cotton picking machine so as to progressively sweep the cotton from between the rows toward the cotton stalks 12. It is important to note that respective sweep fingers 31 of the rear-most pair of lifter wheels 19 and 23, FIGS. 1 and 6, are in peripheral intermeshing contact at the point 35. The cotton 38 on the ground has been picked up from the ground 37 at the point 36 and pinched between intermeshing fingers 31 of wheels 19 and 23 at the point 35 with the cotton stalks 12 at the same time passing into and between the intermeshing area of the wheels 19 and 23 at point 35, the plants passing relatively through the deflectable flexible fingers 31. This action thus picks the cotton up from the ground at 36 and lifts it up and drops or otherwise attaches the cotton on the stalks as at 39 where it is readily picked by the ordinary spindles 40 of the cotton picking machine; also, lower branches are raised and the cotton thereon made accessible to the spindles.

The sweeper wheels 19–26 are angularly positioned and journaled on the pivoted arms 27 on suitable pivot pins 41 so as to be articulated to ride over most of the cotton bed without missing any cotton lying on the ground. The sweeper wheels are rotated by passing over the ground with the forward motion of the cotton picking machine and are angularly positioned so as to cause a side thrust to the center of the stalk row, moving with it any loose object on the ground surface 37.

In the present exemplary specific embodiment, each sweeper wheel moves approximately an eight inch width of loose cotton and passes this load to the next rearwardly positioned sweeper wheel and so on until the cotton reaches the final lifter wheels 19 and 23.

The rear lifter wheels 19 and 23 have a slight ground sweeping action but their essential purpose is to lift the cotton from between the stalks and lower branches to about twelve to sixteen inches above ground level 37 and roll it forward to be deposited on the passing stalks 12 which carry the thus picked up cotton to the picker spindles 40 of the cotton picking machine 10. With this arrangement most of the dropped cotton from previous picking operations is transferred from the ground 37 to the plants 12 with a single pass of the unit. Furthermore, most of the trash in the form of twigs, burrs, dirt and the like is dropped to the ground as the cotton is lifted and the balance of the trash is eliminated in the picking action by the spindles 40, resulting in a high quality in the gin-out of the picked up cotton.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A cotton sweeper attachment for the frame of a cotton picking machine comprising in combination:
   (a) a pair of laterally spaced sweeper wheels journaled on the frame of the cotton picking machine disposed to freely revolve about axes sloping upwardly and forwardly relative to the direction of travel of the attachment along a cotton plant row to be operated upon,
   (b) radially disposed flexible sweeper fingers formed on the periphery of said sweeper wheels, said fingers positioned to roll with their outer ends in contact with the ground surface and in intermeshing engagement with each other in an area below the axes of said sweeper wheels and rearwardly of the point of ground contact of the outer ends of said sweeper fingers so as to laterally pinch and pick up the cotton from the ground surface and raise it rearwardly and upwardly in said intermeshing area of said flexible fingers to attach the picked up cotton to the cotton row plants as the plants pass relatively between the intermeshing flexible fingers of said sweeper wheels.

2. A cotton sweeper attachment for the frame of a cotton picking machine comprising in combination:
(a) a pair of laterally spaced sweeper wheels journaled on the frame of the cotton picking machine disposed to freely revolve about axes sloping upwardly and forwardly relative to the direction of travel of the attachment along a cotton plant row to be operated upon,
(b) radially disposed flexible sweeper fingers formed on the periphery of said sweeper wheels, said fingers positioned to roll with their outer ends in contact with the ground surface and in intermeshing engagement with each other in an area below the axes of said sweeper wheels and rearwardly of the point of ground contact of the outer ends of said sweeper fingers so as to laterally pinch and pick up the cotton from the ground surface and raise it rearwardly and upwardly in said intermeshing area of said flexible fingers to attach the picked up cotton to the cotton row plants as the plants pass relatively between the intermeshing flexible fingers of said sweeper wheels,
(c) and further divergently arranged sweeper wheels journaled on said frame of the cotton picking machine adapted to laterally sweep the fallen cotton from the furrows toward the plant row to be accessible to said first mentioned pair of sweeper wheels.

References Cited in the file of this patent

UNITED STATES PATENTS

| | | |
|---|---|---|
| 1,105,235 | Appleby | July 28, 1914 |
| 1,879,823 | Ray | Sept. 27, 1932 |
| 2,401,152 | Hagen | May 28, 1946 |
| 2,682,739 | Bozeman et al. | July 6, 1954 |
| 2,766,576 | Van der Lely | Oct. 16, 1956 |
| 2,832,185 | Gardner | Apr. 29, 1958 |
| 2,845,769 | Hintz et al. | Aug. 5, 1958 |
| 2,993,545 | Hammer et al. | July 25, 1961 |
| 3,040,505 | De Tuncq et al. | June 26, 1962 |